United States Patent [19]

Jones

[11] 4,260,349

[45] Apr. 7, 1981

[54] RECIPROCATING PELLET PRESS

[75] Inventor: Charles W. Jones, Seminole, Fla.

[73] Assignee: The United States of America as represented by the United States Department of Energy, Washington, D.C.

[21] Appl. No.: 110,143

[22] Filed: Jan. 7, 1980

[51] Int. Cl.[3] .......... B29H 5/24

[52] U.S. Cl. .......... 425/150

[58] Field of Search .......... 425/150

[56] References Cited

U.S. PATENT DOCUMENTS

| | | | |
|---|---|---|---|
| 3,342,917 | 9/1967 | Laskiewicz | 264/109 |
| 3,344,213 | 9/1967 | Vinson | 264/109 |
| 3,397,429 | 8/1968 | Zavitz et al. | 425/150 |
| 3,430,538 | 3/1969 | Weiss | 425/150 |

*Primary Examiner*—Donald E. Czaja
*Assistant Examiner*—James R. Hall
*Attorney, Agent, or Firm*—George H. Libman; Dudley W. King; Richard G. Besha

[57] ABSTRACT

A machine for pressing loose powder into pellets using a series of reciprocating motions has an interchangeable punch and die as its only accurately machines parts. The machine reciprocates horizontally between powder receiving and pressing positions. It reciprocates vertically to press, strip and release a pellet.

8 Claims, 6 Drawing Figures

RECIPROCATING PELLET PRESS

FIELD OF THE INVENTION

The invention described herein relates generally to pellet presses and more particularly to a machine for pressing loose powder into pellets using a series of reciprocating motions. It is the result of a contract with the Department of Energy.

DESCRIPTION OF THE PRIOR ART

Pellet presses have used the following components to compress a powder at high pressure until it forms into a pellet: vertically moving pellet punch; stationary die to guide the punch; source of powder; apparatus for carrying the powder to the punch and die; stationary or vertically moving ram against which the punch presses the powder into a pellet; and apparatus for removing the pressed pellet from the vicinity of the punch in order that the cycle may be repeated and another pellet pressed. Depending on their construction, such devices have various disadvantages which are overcome by this invention.

One typical pellet press has a stationary hopper feeding powder to a hollow, open bottom, shoe disposed for pivoting over a surface including a recessed ram and die. When the shoe is over the ram, powder drops into the recession. After the shoe pivots away from the ram, the powder is compressed by a downward force from a punch. An upward motion of the ram strips the finished pellet from the die where it will be knocked into a collection area as the shoe pivots back to refill the punch and die cavity. Two disadvantages of this arrangement are that both the punch and ram must make reciprocating movements and the large amount of powder carried by the rapidly moving shoe tends to be strewn over the work area, to the detriment of environmental considerations.

A press for large, heavy pellets where the punch and ram remain stationary relative to each other in the horizontal direction is shown in U.S. Pat. No. 2,842,827. This cinder block press uses a reciprocating feed box to carry powder from a stationary hopper to a punch and mold. The fall of powder into the mold from the box presents the opportunity for loose powder to be strewn over the work area. In addition, due to the mass of the pressed blocks, the invention of that patent raises the mold so that the blocks may be removed from the press on a horizontal conveyor.

U.S. Pat. No. 3,905,735 discloses a slab press having a stationary punch and ram and a reciprocating die to carry powder between the hopper and the punch. This arrangement minimizes the movement of powder but suffers the disadvantage of requiring critical alignment, as misadjustment results in the punch destroying the die rather than pressing the powder. The patented device has an arrangement for using a stack of finished slabs as the ram for succeeding slabs and removing one slab from the bottom of the stack each time another slab is pressed onto the top.

U.S. Pat. No. 3,726,622 discloses a press with a stationary punch and die that are covered by a rotating head having a hopper, a ram, and a pellet remover. That device solves the problem of flying powder by completely enclosing the hopper; however, it has possible difficulties with alignment of the head as rotary motion does not lend itself to the positive stops of reciprocating motion.

STATEMENT OF THE OBJECTS

It is an object of this invention to provide a pellet press that requires few accurately machined parts.

It is another object of this invention to provide a pellet press that minimizes the movement of loose powder, thereby reducing the powder level at the work area.

It is a further object of this invention to provide a pellet press which utilizes reciprocating movements of elements having positive stops.

It is still another object of this invention to provide a pellet press where the compression force is provided by a readily available commercial pellet press.

It is a still further object of this invention to provide a pellet press which minimizes the opportunity for an operator's fingers to be caught in the mechanism.

It is also an object of this invention to provide a pellet press which uses reciprocal motion to ensure consistency of pressed pellets.

Other objects, advantages and novel features of the invention will become apparent to those skilled in the art upon examination of the following detailed description of a preferred embodiment of the invention and the accompanying drawings.

SUMMARY OF THE INVENTION

This invention is the combination of spaced platens, of a press, for example, a driving mechanism for moving at least one of the platens between a wider spaced first position and a closer spaced second position, and apparatus for use with the press. The apparatus includes a ram which is suspended from the upper platen, a hopper mounted adjacent the ram for holding and dispensing powder, a transport including a punch and die slidable under the hopper and ram, and a reciprocating motor for sliding the transport. The transport has an upper plate which is adjustable in height relative to the lower platen alternately to provide a cavity above the punch but within the die orifice for powder and to strip the finished pellet from the orifice. The operation of this apparatus may be coordinated with the operation of a press to provide for the automatic production of pellets.

DESCRIPTION OF THE PREFERRED EMBODIMENT

The pellet press of this invention may include a conventional hydraulic press to provide pressure and apparatus mounted generally within and actuated by the press to carry a powder and form it into a pellet.

As contemplated by this invention, press 10 has an upper platen 11, an opposed lower platen 12 and a motor (not shown) for controllably moving either or both of the platens from a wider spaced first position to a closer spaced second position. Preferably, the press is controlled such that it closes to the second position for a first predetermined time at a high pressure, and then remains at the second position for a second predetermined time at a lower pressure before releasing to the first position.

A press which has been used in the practice of this invention is the Wabash model 50-18-SMAC as modified at the request of the inventor. This modified electrically controlled hydraulic press is available from the Wabash Co. of Wabash, Ind. It has a movable lower platen, a high pressure selectable from one to fifty tons, and a lower pressure of 1000 pounds. Since this press is conventionally provided with manual push button actuaters, it is further modified with the addition of a relay having contacts in parallel with the actuators to make the press capable of automatic operation upon the application of an electric signal. The last modification necessary to enable the fully automatic use of the invention is the provision of relay K2 to provide an external control signal when the pressure reduces from the high pressure to the lower pressure. The inclusion of these relays in the modified Wabash press is a routine matter for one of ordinary skill in the art. A schematic diagram of the press is not shown to avoid burdening this specification with unnecessary detail.

The apparatus carried by this press includes a system for providing powder, a hopper for receiving and dispensing powder, a punch and die for carrying increments of powder to a pressing station, a mounting structure for carrying the punch and die, and reciprocating means for moving the structure. An electronic and pneumatic control is also provided to coordinate movement of the reciprocating means and the press to automatically press a series of pellets.

Figure 1:
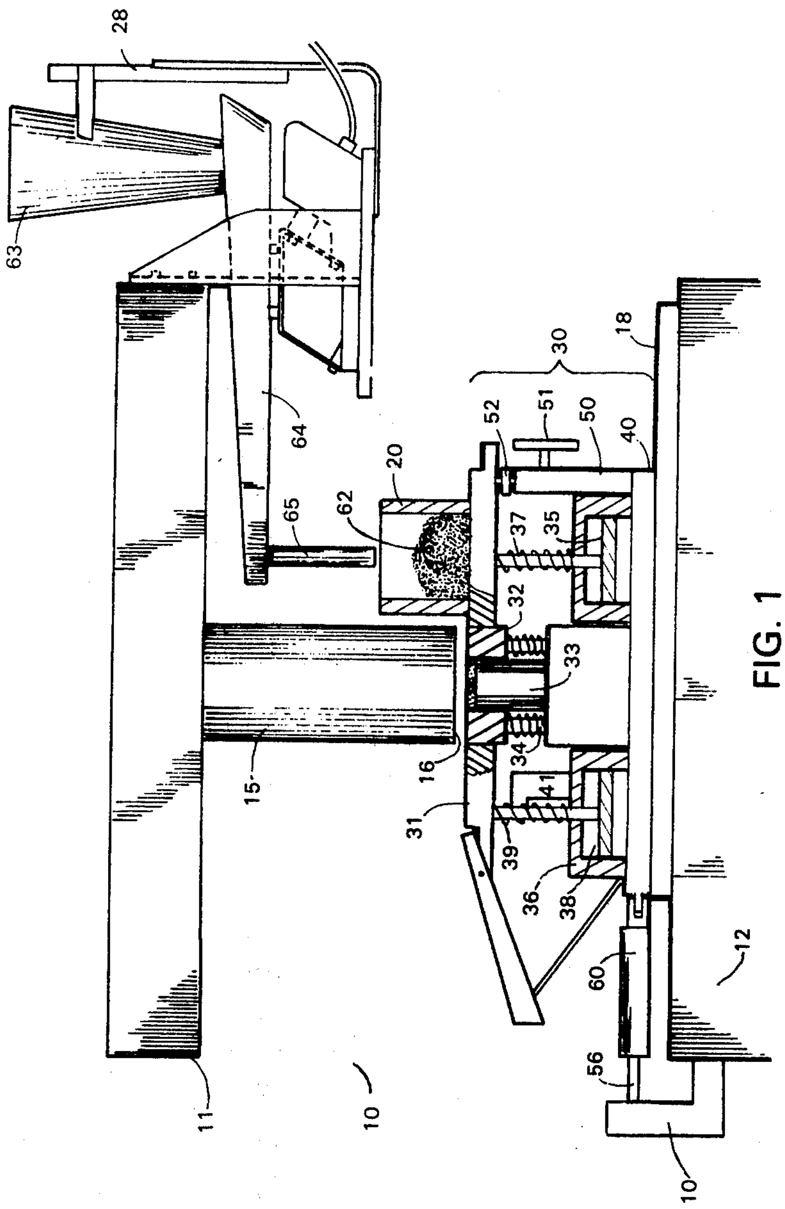
FIG. 1 is a partial sectional plan view of the transport in the pressing position and the platens in the first position prior to pressing a pellet. Details of the height adjusting mechanism are omitted from this view.
Figure 2:
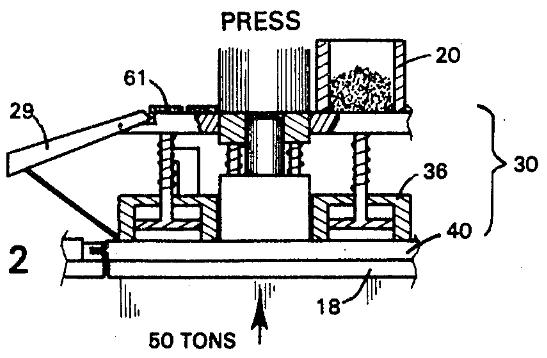
FIG. 2 is a plan sectional view of a portion of the transport and ram when the platens are in the second position pressing a pellet.

As shown especially in FIGS. 1 and 2, suspended from upper platen 11 is platen ram 15. This ram has a generally horizontal lower surface 16 against which a pellet is pressed upon movement of lower platen 12 to the second position.

Figure 5:
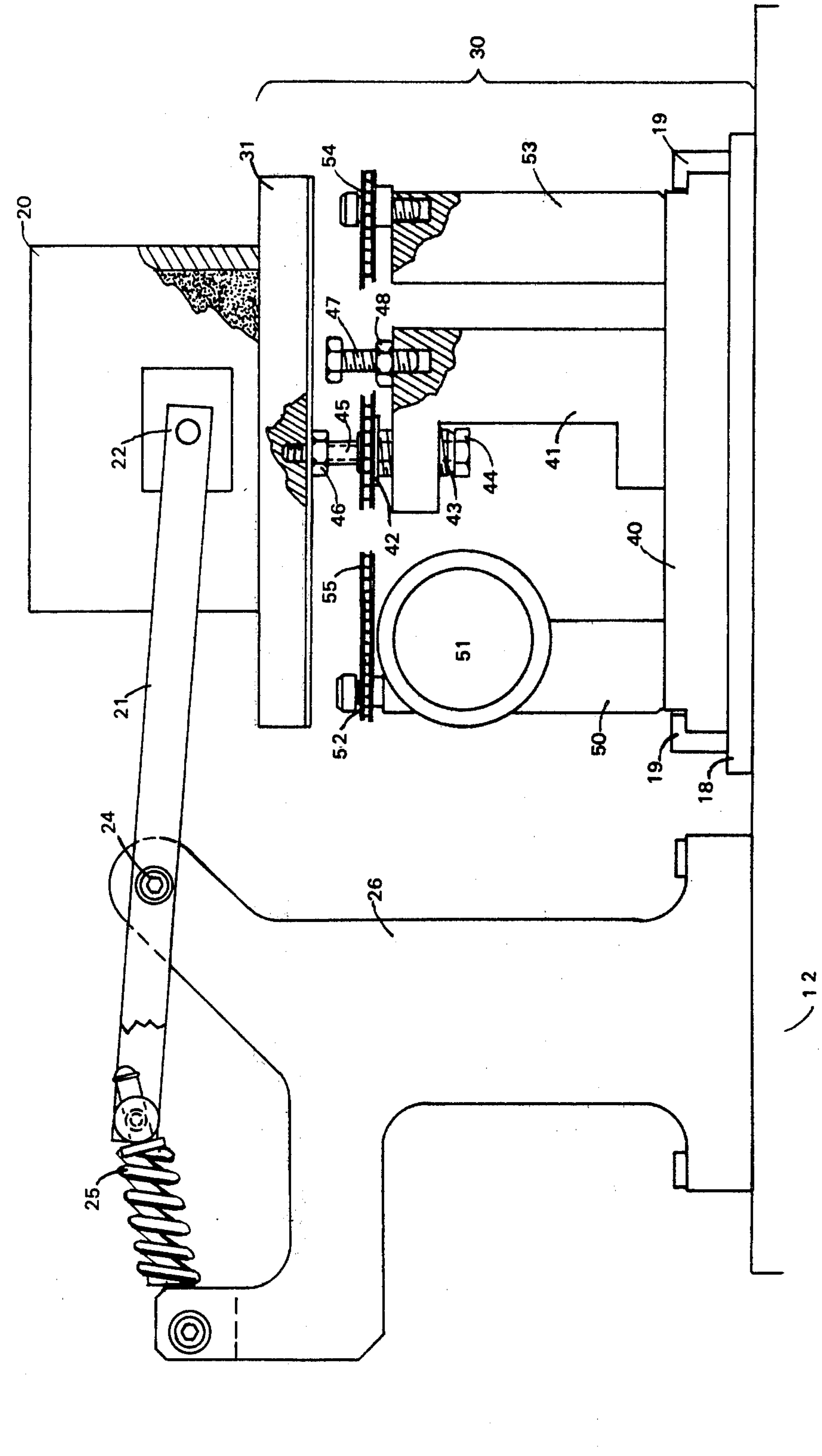
FIG. 5 is a plan sectional view of the end of the transport showing the hopper and the height adjusting mechanism of the transport in detail. Structure behind the height adjusting mechanism has been omitted to avoid cluttering this view.

Powder hopper 20 is mounted beside ram 15. Hopper 20 is a vertically disposed, open ended, hollow cylinder constrained against horizontal movement relative to the ram by a connection through pivots 22 (one of which is shown in FIG. 5) to a yoke in an end of arm 21. The arm is also connected by pivot 24 to stand 26 and biased by spring 25 to force hopper 20 in a downward direction. Stand 26 is rigidly affixed to lower platen 12. A supply of any powder which, due to a geometric particle shape, allows pelletization, is provided to hopper 20 by vibratory feeder 28, which can be a commercially available FMC Model F-TD or equivalent having, typically, powder horn 63, vibrating tray 64 and dispensing tube 65. Power to feeder 28 is controlled so that the flow of powder into hopper 20 is the same as the flow of powder into the pellet press.

Figure 3:
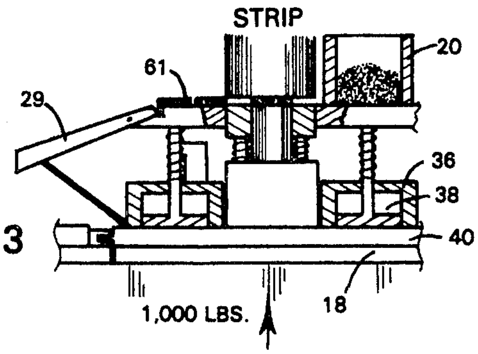
FIG. 3 is a view similar to FIG. 2 with the platens still in the second position and the upper plate of the transport in the stripping position.

The lower surface of powder hopper 20 is provided by upper plate 31 of transport 30. Upper plate 31 includes pellet die 32 having an orifice containing the upper end of punch 33. This orifice and pellet punch are the only components of this invention which require manufacture to close tolerances. Upper plate 31 is arranged to slide as described hereinafter such that die 32 is under hopper 20 when transport 30 is in a powder receiving position (FIG. 4) and under ram 15 when transport 30 is in a pressing position (FIGS. 1–3). For safety considerations, transport 30 is constructed so that the spacing between upper plate 31 and ram surface 16 is too small for the accidental insertion of a finger by the operator.

Figure 6:
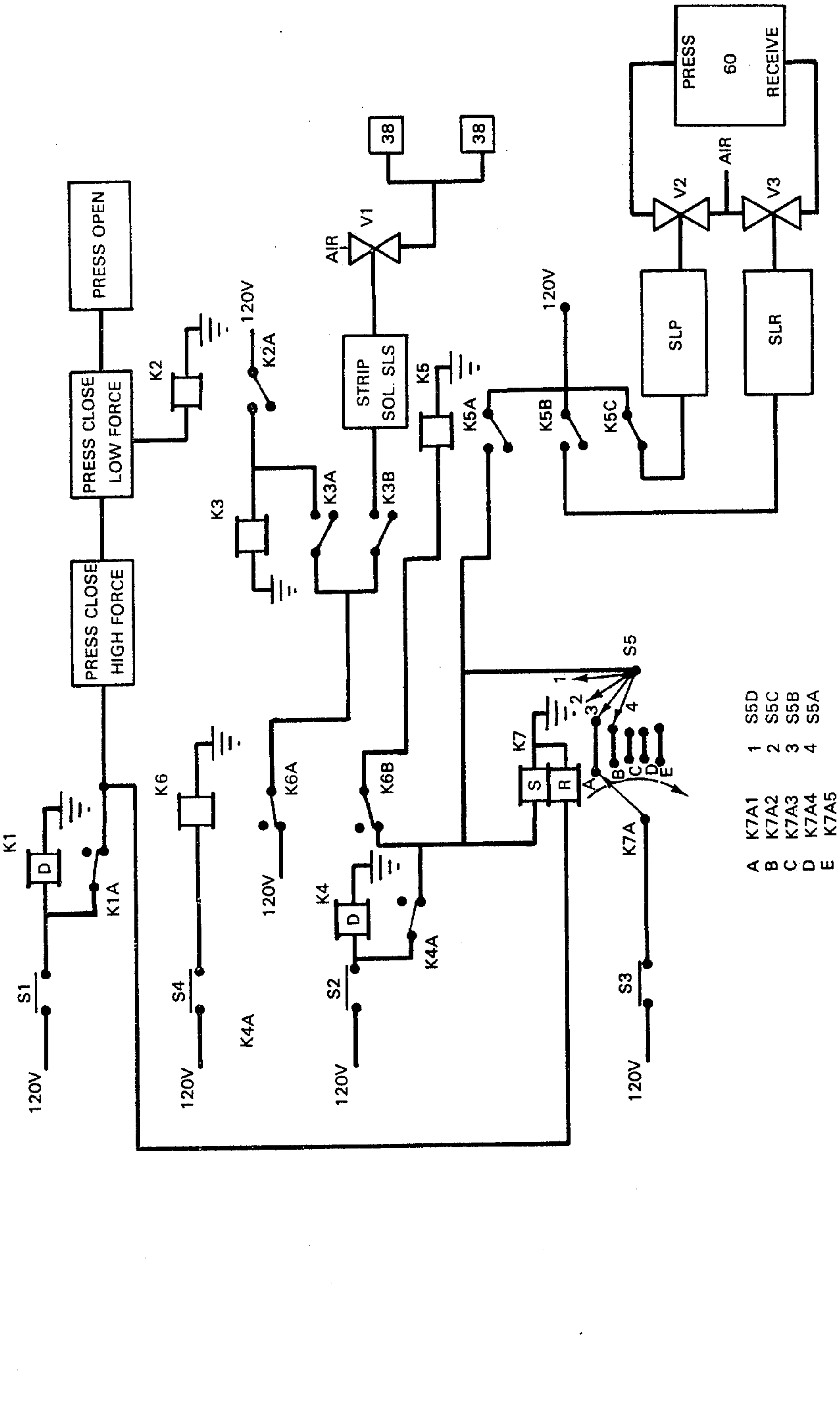
FIG. 6 is a schematic diagram of the electrical and pneumatic circuits of the invention.

Upper plate 31 is supported above lower plate 40 of transport 30 by mounting structure which includes punch and die springs 34 and at least one air cylinder including cylinder 36, piston 35, piston rod 37 and spring 39. Two spaced cylinders are used in a preferred embodiment of the invention. Each of cylinders 36 has an air input to chamber 38 through solenoid controlled valve V1 (FIG. 6). Piston 35 moves downwardly within cylinder 36 upon the passage of air through valve V1 into chamber 38. Piston rod 37 is connected between piston 35 and upper plate 31 to pull plate 31 down against the force of springs 34 and 39 upon actuation of valve V1. This operation is performed to strip the pressed pellet from the die, as will be discussed hereinafter.

Since upper plate 31 is forced upwardly from lower plate 40 by a plurality of springs and forced downwardly by a pair of air cylinders, positive mechanical stops are provided in order that the amount of travel can be accurately controlled.

In a typical application, three spaced height adjusting mechanisms are provided to limit the movement of upper plate 31 relative to lower plate 40. Two of these mechanisms are spaced along the end of transport 30 nearest to platen ram 15. The other mechanism is positioned at a midpoint of the other end of transport 30. The mechanisms are interconnected by chain 55 in a manner to be described.

As shown in detail in FIG. 5, each height adjusting member includes an upright C-shaped member 41 having one end fastened to lower plate 40 and the other end spaced from the underside of upper plate 31. Hollow sleeve 43 is screwed through a threaded vertical hole in the other end of the C-shaped member for vertical movement therein. Gear 42 is affixed to sleeve 43 to effect rotation of the sleeve in order that its height relative to the C-shaped member may be adjusted. Bolt 45 is slidingly mounted through sleeve 43 and threaded into the underside of upper plate 31. Jam nut 46 prevents loosening of this bolt. The pressure of springs 34 and 39 causes the head 44 of bolt 45 to abut the bottom of sleeve 43, thus constraining upward movement of upper plate 31.

Each height adjusting member also includes a bolt 47 screwed into the top of C member 41 and held in place with jam nut 48. The head of bolt 47 serves as a stop to limit downward movement of upper plate 31 when air cylinders 36 are actuated.

The three geared height adjusting members may be simultaneously adjusted by manually turning knob 51, which is connected through a conventional worm gear (not shown) in support 50 to drive gear 52 at one corner of the other end of transport 30. Idler gear 54 is mounted on support 53 at the other corner of the other end of the transport to support chain 55 at the perimeter of transport 30 as it connects the three height adjusting members and the drive gear.

Air cylinders 36, C-shaped members 41, and supports 50 and 53 are secured to, and punch 33 rests against, lower plate 40 of transport 30. Since punch 33 and die 32 are an integral unit, and die 32 is clamped into upper plate 31 by any conventional technique, the punch need not be fastened to the lower plate. However, the invention also contemplates the use of an equivalent arrangement where a punch is fastened to the lower plate and a separate die is clamped to the upper plate.

Transport 30 is arranged to slide over lower platen 12 between the powder receiving position and the pressing position on adapter plate 18, which is rigidly attached to lower platen 12. Adapter plate 18 includes spaced parallel rails 19, each having the shape of an inverted "L", to coact with and guide the parallel edges of lower plate 40. Reciprocating movement of the transport is provided by air cylinder 60, the piston rod 56 of which is fastened by an easily separable arrangement such as a clevis pin to lower platen 12 and the cylinder of which is rigidly fastened to the end of lower plate 40 nearest to the platen ram.

From the above description of a preferred embodiment, it is seen that all parts of this invention which are moveable during the pressing of a pellet use linear reciprocating motion. This feature enables each movement to be accurately and easily controlled by a positive stop, thereby minimizing alignment difficulties during the rapid movements inherent in the automatic manufacturing of pellets. In addition, since the punch and die move as a unit with the transport from a powder receiving position to a pressing position under a broad ram surface, the alignment of the transport relative to the ram is not critical.

Operation of the invention will now be described with particular reference to FIGS. 1–5 and the circuit diagram of FIG. 6. Several items indicated in FIG. 6 are not physically shown in FIGS. 1–5 because they are standard items, the further illustration of which could only serve to obfuscate the invention. These include limit switch S2 to close only when lower platen 12 is in its first position and limit switches S1 and S4 and S3 which close only when transport 30 is in its pressing and powder receiving positions and at a midpoint therebetween, respectively. It is recognized that one of ordinary skill in this art would have no problem mounting these switches on the structure of the invention to provide the intended indications. In addition, the conventional solenoid operated valves V1, V2 and V3 and the air conduits which power cylinders 36 and 60 have been omitted to avoid cluttering FIGS. 1–6.

Prior to operation, knob 51 is rotated to adjust the height of upper plate 31 relative to the upper surface of punch 33. Since the amount of powder to be pressed into each pellet is dependent on this adjustment, knob 51 enables the operator to adjust the thickness of the pellets.

At the same time bolts 47 are adjusted so that downward movement of upper plate 31 upon actuation of air cylinders 36 corresponds to the thickness of the pressed pellet, whereby bolt 47 will stop the upper plate when it is even with the upper surface of punch 33.

Since this pellet press cycles continuously during its production of pellets, it does not matter where in the cycle a description of the operation begins. For convenience, it may be assumed the system is in the state shown in FIG. 1 where powder has been loaded into the die, the transport is in the pressing position, and the press is about to move to its second position.

Referring to FIG. 6, with transport 30 in the pressing position, limit switch S1 is closed energizing delay relay K1. During the delay period of approximately three seconds before contact K1A opens, a signal is provided from the AC line through S1 and K1A to cause press 10 to move lower platen 12 to its second position with the required high force and to reset stepping relay K7. After contact K1A opens, press 10 cannot be actuated again until transport 30 slides away from and returns to the pressing position.

Stepping relay K7 has a contact K7A which is stepped in turn to contact lines K7A1, K7A2, K7A3, K7A4, and K7A5. Selector switch S5 has a plurality of parallel connected contacts S5A, S5B, S5C and S5D which are spaced such that when S5A contacts K7A4, S5B contacts K7A3, S5B contacts K7A2, and S5A contacts K7A1. By rotating switch S5, the number of lines touching its contacts may be varied, thereby enabling the operator to set the number of times the transport will oscillate in the powder receiving position as hereinafter described. In the example to follow, switch S5 is set with contact S5A touching line K7A2 and S5B touching K7A1, as shown in FIG. 6. The reset of K7 noted above moved contact K7A to line K7A1.

As shown in FIG. 3, upon actuation of press 10, die 32 and upper plate 31 move upward with lower platen 12 until they contact lower surface 16 of ram 15. Lower platen 12 continues to move upward, pressing punch 33 against the powder with the high force and compressing springs 32 and 39. Hopper 20 rides upward with upper plate 31, compressing spring 25 (FIG. 5).

After a predetermined amount of time the force of punch 33 against the powder has converted it into a pellet. At this time the controller causes press 10 to release to 1000 lbs of force and produces a signal which causes relay K2 to energize. When contact K2A closes, relay K3 is energized through the AC line to initiate the pellet stripping cycle.

When contact K3A closes, relay K3 is held closed by an AC signal through normally closed contact K6A. Strip solenoid SLS is energized through contact K3B, causing pressurized air to pass through valve V1 to chambers 38 of cylinders 36. The air pushes pistons 35, piston rods 37, and upper plate 31 downward toward lower platen 12. Downward movement of upper plate 31 is stopped by bolt 47 when the upper surface of die 32 is level with the upper surface of punch 33. As FIG. 3 shows, at this point in the cycle the pellet has been stripped of the die but is still firmly held in place between punch 33 and ram 15 by the lowered force of press 10.

At this predetermined time press 10 moves lower platen 12 to the first position, releasing pellet 61 from ram 15. Upper plate 31 remains level with die 32 as cylinders 36 remain energized until contact K6A opens.

Figure 4:
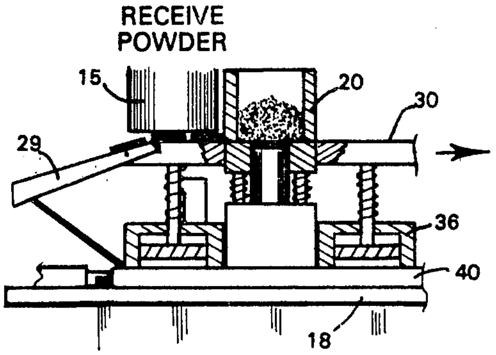
FIG. 4 is a view similar to FIG. 2 with the platens in the first position and the transport in the powder receiving position.

When lower platen 12 reaches the first position, limit switch S2 is closed to energize delay relay K4. Before contact K4A opens after a few seconds delay, the AC signal steps relay K7 so that contact K7A touches line K7A2. The signal also passes through S2 and closed contacts K4A and K6B to energize relay K5, which is held on by an AC signal through contact K5A until contact K6B opens. Contacts K5B and K5C control solenoids SLP and SLR, respectively, allowing pressurized air to pass through either valve V2 to cause cylinder 60 to move transport 30 to the pressing position or valve V3 to cause cylinder 60 to move transport 30 to the powder receiving position. Accordingly, with K5 energized, V2 closes and V3 opens and transport 30 moves to the receiving position as shown in FIG. 4. As pellet 61 is carried by transport 30, it strikes the side of hopper 20, causing it to remain stationary while upper plate 31 slides beneath it. When transport 30 reaches the receiving position, pellet 61 will fall onto collection chute 29, causing it to fall away from press 10 for storage.

When transport 30 reaches the midpoint position, limit switch S3 closes, passing the AC signal through line K7A2 to switch S5. However, since S5 is already energized with an AC signal through contact K5A, no change to the circuit results. Switch S3 reopens as transport 30 continues to move.

When transport 30 reaches its powder receiving position, limit switch S4 closes energizing relay K6. The opening of contact K6A causes the hold on relay K3 through contact K3A to break, deenergizing solenoid SLS, closing valve V1, and causing the pressure in chambers 38 to drop, whereby springs 34 and 39 force upper plate 31 upwards until it is stopped by bolt head 44. With the upper plate 31 being slightly higher than the upper surface of punch 33 as shown in FIG. 5, powder from hopper 20 can fill the cavity.

It has been found that merely sliding transport 30 back to the pressing position does not always fill the cavity in a uniform manner each cycle, resulting in pellets which were not uniform. Accordingly, circuitry is provided to cause the transport to oscillate back and forth a predetermined number of times before returning to the pressing position.

As discussed above, when transport 30 reaches the receiving position, limit switch S4 closes to energize relay K6. The opening of contact K6B breaks the hold circuit on relay K5 causing contact K5B to open and contact K5C to close. This action deenergizes solenoid SLR and energizes solenoid SLP, causing air to pass through valve V2 into cylinder 60 to move transport 30 back towards the pressing position.

As transport 30 moves from the receiving position, limit switch S4 opens, causing relay K6 to deenergize. The transport closes limit switch S3 when it reaches the midpoint of its movement. This time the AC signal which passes through contact K7A, line K7A2 and switch S5 will reenergize relay K5 and also step relay K7, causing contact K7A to touch line K7A3. As discussed above, relay K5 causes valve V2 to close and valve V3 to open, passing air into cylinder 60 to move transport 30 back toward the receiving position where limit switch S4 will again close, deenergizing relay K5, and causing transport 30 to again move back toward the pressing position.

This time when limit switch S3 again closes, transport 30 does not oscillate back because contact S5A had not been set to line K7A3. It is therefore apparent that with the contact S5A at line K7A2 the transport will shuffle once, with contact S5A at line K7A3 and contact S5B at line K7A2 the transport will shuffle twice, etc.

When transport 30 reaches the pressing position limit switch S1 closes and the pressing cycle repeats.

The press described above has been used to press a powder consisting of a eutectic mixture of KCL and LiCl mixed with $CaCrO_4$ and a form of $SiO_2$ called Cabosil into pellets having a diameter of approximately 1.5 inches and a thickness of approximately 1/16th inch.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

I claim:

1. In a pellet manufacturing apparatus including an upper platen, a lower platen, and means interconnecting said platens for moving at least one platen relative to the other between a wider spaced first position and a closer spaced second position, wherein the improvement comprises: a ram surface suspended from said upper platen; an upper plate, positioned between said ram surface and said lower platen, having an orifice extending between upper and lower surfaces thereof; punch means with portion projecting into said orifice for movement therein relative to said plate; a powder hopper having a bottom opening for dispensing powder; means for supporting said hopper adjacent said ram surface and against said upper surface of said plate; mounting structure attached to said plate; and reciprocating means attached to said lower platen for moving said mounting structure to position said punch means in pressing position beneath said ram surface and in powder receiving position beneath said hopper opening.

2. The pellet manufacturing apparatus of claim 1 wherein said plate includes a pellet die having upper and lower surfaces, the upper surface of said die forming a portion of the upper surface of said plate, said orifice being contained with said die.

3. The pellet manufacturing apparatus of claim 1 wherein said punch means has a surface for pressing powder into a pellet against said ram when said platens are moved to the second position, said surface being located within said orifice when said platens are in the first position.

4. The pellet manufacturing apparatus of claim 1 wherein said mounting structure includes means for resiliently biasing said upper plate away from said lower platen; and means for moving said upper plate towards said lower platen in opposition to said biasing means to strip a finish pellet from said orifice.

5. The pellet manufacturing apparatus of claim 4 wherein said mounting structure further includes a lower plate disposed for sliding over said lower platen; and said means for moving said upper plate includes a cylinder secured to said lower plate; a piston disposed for vertical movement within said cylinder; a piston rod connected between said piston and said upper plate; and means for hydraulically moving said piston toward said lower platen.

6. The pellet manufacturing apparatus of claim 5 wherein said biasing means includes a coil spring disposed around said piston rod and extending from said cylinder to said upper plate; and said mounting structure further includes stop means for limiting movement of said upper plate away from said lower platen under the influence of said spring and toward said lower platen under the influence of said piston rod.

7. The pellet manufacturing apparatus of claim 1 further including: first means for providing a signal when said mounting structure has positioned said punch means in the receiving position; second means for providing a signal when said mounting structure has positioned said punch means at a point approximately middistant between the pressing position and the receiving position; third means for providing a signal when said mounting structure has positioned said punch means in the pressing position; and control means responsive to said first, second, and third means for energizing said reciprocating means to move said mounting structure according to the following pattern while said platens are in the first position: from the pressing position to the receiving position; from the receiving position to the middistant position; from the middistant position to the receiving position; from the receiving position to the pressing position.

8. The pellet manufacturing apparatus of claim 7 wherein said control means further includes selector means for varying the number of times the reciprocating means moves the mounting structure from the receiving position to the middistant position and back to the receiving position before returning it to the pressing position.

* * * * *